United States Patent
Wiegers et al.

(10) Patent No.: US 10,011,361 B2
(45) Date of Patent: Jul. 3, 2018

(54) AIRCRAFT ENVIRONMENTAL CONTROL SYSTEM PROVIDING IMPROVED PERFORMANCE AND BACKUP TEMPERATURE CONTROL

(71) Applicant: Textron Innovations Inc., Providence, RI (US)

(72) Inventors: Robert Glynn Wiegers, Wichita, KS (US); Darrel Duane Hornbaker, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 326 days.

(21) Appl. No.: 14/942,946

(22) Filed: Nov. 16, 2015

(65) Prior Publication Data

US 2017/0137132 A1 May 18, 2017

(51) Int. Cl.
  *B64D 13/06* (2006.01)
(52) U.S. Cl.
  CPC ...... *B64D 13/06* (2013.01); *B64D 2013/0618* (2013.01)
(58) Field of Classification Search
  CPC ................ B64D 13/06; B64D 2013/0618
  See application file for complete search history.

(56) References Cited

U.S. PATENT DOCUMENTS

| | | | |
|---|---|---|---|
| 2,870,698 A | 1/1959 | Best | |
| 3,326,109 A | 6/1967 | Markham | |
| 4,261,416 A | 4/1981 | Hamamoto | |
| 4,462,561 A * | 7/1984 | Cronin | B64D 13/06 244/118.5 |
| 4,494,372 A * | 1/1985 | Cronin | B64D 13/06 60/785 |
| 4,546,939 A * | 10/1985 | Cronin | B64D 13/06 244/118.5 |
| 4,759,178 A | 7/1988 | Joy | |
| 5,516,330 A | 5/1996 | Dechow et al. | |

(Continued)

OTHER PUBLICATIONS

Kelly Aerospace Thermal Systems NC-08-006 182T, T182T Air Conditioning Installation Manual and Service Letter, May 16, 2008.

(Continued)

*Primary Examiner* — Ljiljana Ciric
(74) *Attorney, Agent, or Firm* — Erise IP, P.A.

(57) ABSTRACT

An Environmental Control System (ECS) which includes a heat exchanger (HX) and an air conditioning unit (ACU) upstream of the heat exchanger. The heat exchanger receives flows of hot air bled from a plurality of aircraft engines and flows of cold ambient air drawn from the aircraft exterior for use by the heat exchanger and the air conditioning unit for heating and cooling the interior cabin of the aircraft. The environmental control system may operate in one of several modes, whether the heat exchanger and air conditioning unit are operating normally or have failed. In a normal mode, the air conditioning unit and heat exchanger operate in series. In an "ACU only" mode, the air conditioning unit operates without the heat exchanger. In an "HX only" mode, the heat exchanger operates without the air conditioning unit. In an "ECS off" mode, both the heat exchanger and air conditioning unit are bypassed.

28 Claims, 5 Drawing Sheets

(56) References Cited

U.S. PATENT DOCUMENTS

| | | | |
|---|---|---|---|
| 5,704,218 A | | 1/1998 | Christians et al. |
| 5,709,103 A | * | 1/1998 | Williams ............... B64D 13/06 |
| | | | 244/118.5 |
| 5,860,283 A | | 1/1999 | Coleman et al. |
| 5,899,085 A | * | 5/1999 | Williams ............... B64D 13/06 |
| | | | 62/236 |
| 6,415,621 B2 | | 7/2002 | Buchhotz et al. |
| 6,434,968 B2 | | 8/2002 | Buchholz et al. |
| 6,871,510 B2 | | 3/2005 | Haas |
| 7,305,842 B1 | * | 12/2007 | Schiff ................... B64D 13/06 |
| | | | 62/244 |
| 7,467,524 B2 | | 12/2008 | Brutscher et al. |
| 7,797,962 B2 | | 9/2010 | Kresser et al. |
| 8,365,550 B2 | | 2/2013 | Vogel |
| 9,239,005 B2 | * | 1/2016 | Strecker ................. B64D 13/06 |
| 9,555,893 B2 | * | 1/2017 | Squier ................... B64D 13/08 |
| 2013/0133334 A1 | * | 5/2013 | Strecker ................. B64D 13/06 |
| | | | 60/782 |

OTHER PUBLICATIONS

Cessna Service Bulletin, Electrical Power APU J-Box Mounting Modification, May 25, 1987.

* cited by examiner

AIRCRAFT ENVIRONMENTAL CONTROL SYSTEM PROVIDING IMPROVED PERFORMANCE AND BACKUP TEMPERATURE CONTROL

BACKGROUND

In a typical twin-engine jet, temperature and humidity within the aircraft's crew/passenger compartment, is controlled by an Environmental Control System (ECS). Air bled from the aircraft engines is supplied to the aircraft's pneumatic system, where the temperature and pressure of the bleed air are regulated to predetermined set points (tempered bleed air). These set points are established to ensure proper performance of the aircraft Ice Protection system throughout the aircraft's operating envelope. The tempered bleed air is further supplied to the ECS to generate heating and cooling air for the crew/passenger compartment.

Notably, however, temperature and pressure set points suitable for the aircraft pneumatic system are significantly higher than those suitable for the ECS. As a result, performance of the ECS system is substantially degraded throughout the entire operating envelope at these pressure and temperature set points.

Accordingly, there is an ongoing need for improved performance of environmental control systems for aircraft.

SUMMARY

In an embodiment, an environmental control system (ECS) for aircraft is provided. The system includes a bleed air network for carrying flows of air bled from a plurality of aircraft engines, an ambient air network for carrying a flow of ambient air, a heat exchanger, an air conditioning unit, and a first temperature control valve (TCV). The bleed air network includes a first bleed air conduit in fluid communication with a first aircraft engine for receipt of engine air bled from the first aircraft engine and in further fluid communication with an aircraft interior cabin. The bleed air network also includes a second bleed air conduit branched from the first bleed air conduit at a first bleed air junction and in fluid communication with a heat exchanger (HX). The ambient air network includes a first ambient air conduit in fluid communication with an aircraft exterior for receipt of ambient air and in further fluid communication with the heat exchanger. The ambient air network further includes a second ambient air conduit branching from the first ambient air conduit at a first ambient air junction and in fluid communication with an air conditioning unit (ACU). The heat exchanger has an output in fluid communication with the ACU, wherein the heat exchanger is operative to output a flow of HX air, at a second temperature less than the first temperature, in response to receipt of the engine air and the ambient air. The ACU has output in fluid communication with the first bleed air conduit at a second bleed air junction downstream of the first bleed air junction, wherein the ACU is operative to output a flow of ACU air at a third temperature, less than the second temperature, in response to receipt of the HX air and the ambient air. The first TCV is interposed between the first and second bleed air junctions and is operative to control a first engine air flow rate through the first bleed air conduit downstream of the second bleed air junction based upon a cabin temperature set point and a cabin temperature measured by at least one of a plurality of temperature sensors in thermal communication with the aircraft interior cabin.

In an embodiment, a method of environmental control for aircraft is provided. The method includes providing a bleed air network for carrying flows of air bled from a plurality of aircraft engines and providing an ambient air network for carrying a flow of ambient air. The bleed air network includes a first bleed air conduit in fluid communication with a first aircraft engine for receipt of engine air bled from the first aircraft engine and in further fluid communication with an aircraft interior cabin. The bleed air network further includes a second bleed air conduit branched from the first bleed air conduit at a first bleed air junction and in fluid communication with a heat exchanger (HX). The ambient air network includes a first ambient air conduit in fluid communication with an aircraft exterior for receipt of ambient air and in further fluid communication with the heat exchanger. The ambient air network further includes a second ambient air conduit branching from the first ambient air conduit at a first ambient air junction and in fluid communication with an air conditioning unit (ACU). The method also includes outputting, by the heat exchanger, a flow of HX air, at a second temperature less than the first temperature, in response to receipt of the engine air and the ambient air. The method additionally includes outputting, by the ACU, a flow of ACU air at a third temperature, less than the second temperature, in response to receipt of the HX air and the ambient air. The method further includes routing a portion of the ACU air flow into fluid communication with the first bleed air conduit at a second bleed air junction downstream of the first bleed air junction. The method also includes regulating an engine air flow rate through the first bleed air conduit downstream of the second bleed air junction based upon a cabin temperature set point and a cabin temperature within the aircraft interior cabin.

DETAILED DESCRIPTION

Figure 1:
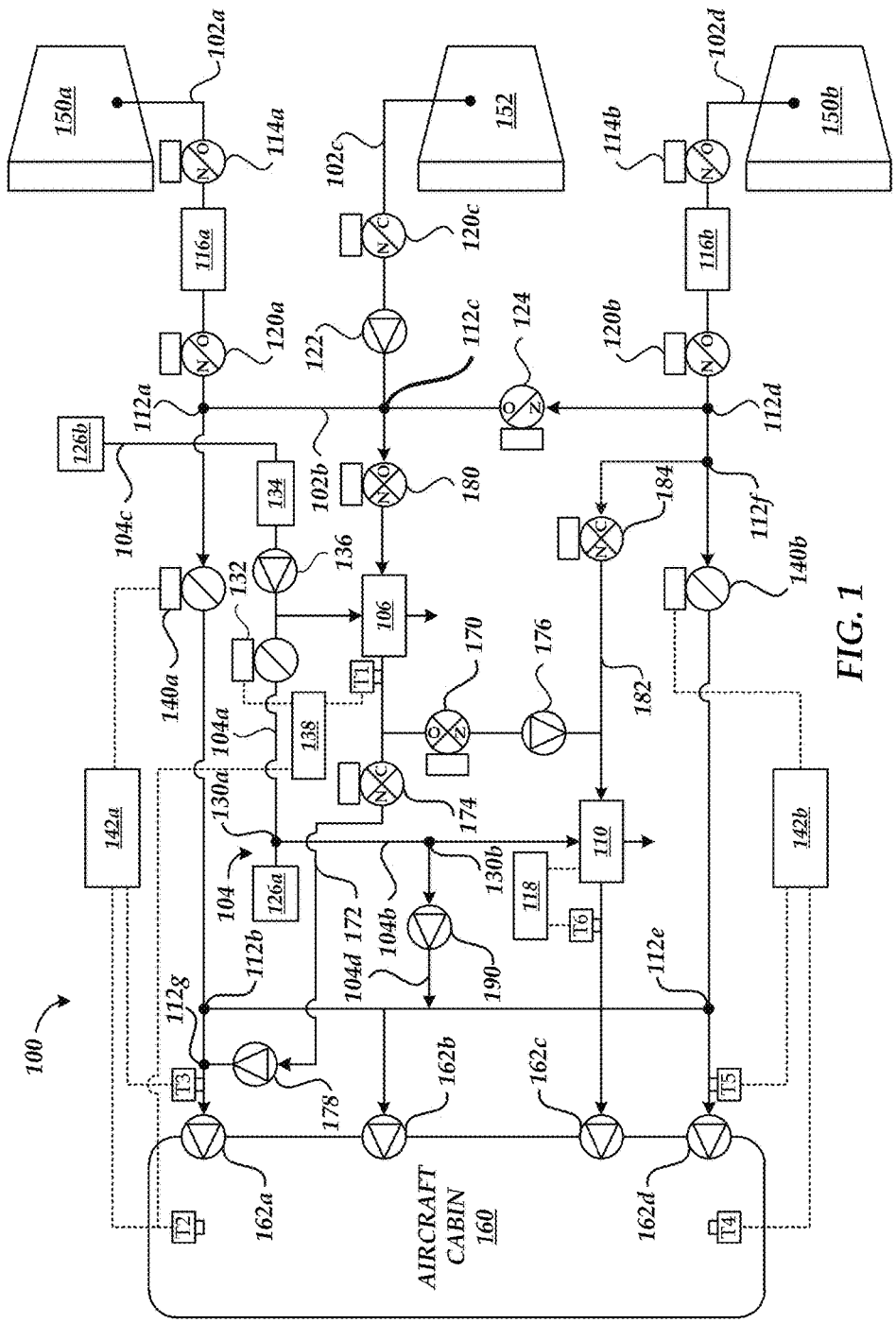
FIG. 1 is an embodiment of an aircraft environmental control system (ECS).

Embodiments of the present disclosure are directed to environmental controls and, in particular, to an Environmental Control System (ECS) for aircraft. As discussed in detail below, the ECS includes a heat exchanger (HX) and air conditioning unit (ACU) upstream of the heat exchanger and receives flows of hot air bled from a plurality of aircraft engines and flows of cold ambient air drawn from the aircraft exterior for use by the heat exchanger and ACU for heating and cooling the interior cabin of the aircraft.

The ECS is configured to operate in one of several modes, depending upon whether the heat exchanger and air conditioning unit are operating normally or have failed. In a normal operating mode, the ACU and heat exchanger operate in series. In an "ACU only" operating mode, the ACU operates without the heat exchanger. In an "HX only" operating mode, the heat exchanger operates without the ACU. In an "ECS off" mode, both the heat exchanger and ACU are bypassed. The ECS includes a plurality of valves to switch between these operating modes.

Beneficially, embodiments of the disclosed ECS provide several advantages over existing aircraft environmental control systems. In one aspect, embodiments of the instant ECS are more efficient than existing aircraft environmental control systems. In general, the efficiency of an air conditioning unit increases when the difference in temperature between the input air and output air decreases. Existing environmental control systems regulate the temperature and pressure of air bled from the aircraft engines for use by the aircraft pneumatic system. This regulated bleed air, also referred to herein as tempered bleed air, is further used by the air conditioning unit for cooling. However, the tempered bleed air is regulated at a temperature significantly higher than that to be output by the air conditioning unit and the air conditioning unit consumes significant power in operation to cool the tempered bleed air. In contrast, embodiments of the instant ECS can operate with the heat exchanger in series with the air conditioning unit so that the heat exchanger cools the tempered bleed air prior to receipt by the air conditioning unit. As a result, the air conditioning unit consumes less power to output air at the desired temperature and the air conditioning unit efficiency is increased compared to existing environmental control systems.

In another aspect, the ability of embodiments of the ECS to operate in the "HX only" mode allows the heat exchanger to provide heating and cooling in case of failure of the air conditioning unit. Existing aircraft environmental control systems often employ a single air conditioning unit in order to reduce the aircraft weight, complexity, and/or operating costs. Should the lone air conditioning unit fail in service, however, control of the aircraft cabin temperature is lost. For example, in the HX only mode, the instant ECS can regulate the temperature of the air output by the heat exchanger for control of the aircraft cabin temperature when the air conditioning unit has failed.

In a further aspect, the ability of embodiments of the ECS to operate in the ACU only mode allows the ACU to provide heating and cooling, in case of failure of the heat exchanger. For example, in the ACU only mode, the ECS can bypass of the heat exchanger and direct engine air to the air conditioning unit for cooling. The cooled engine air output by the air conditioning unit is further mixed with hot engine air for controlling the aircraft cabin temperature. While the efficiency of the air conditioning unit may be reduced in this mode of operation, as compared to normal operation using the heat exchanger and air conditioning unit in series, this operating mode is a significant improvement over existing environmental control systems, which are unable to provide any control over aircraft cabin temperature should the air conditioner fail.

The discussion will now turn to FIG. 1, which illustrates an embodiment of the environmental control system (ECS) 100. The ECS 100 includes a bleed air network 102, an ambient air network 104, a heat exchanger (HX) 106, and an air conditioning unit (ACU) 110. While the embodiment of FIG. 1 illustrates a single heat exchanger 106 and air conditioning unit 110, it may be understood that alternative embodiments of the ECS may include additional heat exchangers and/or air conditioning units without limit.

The bleed air network 102 carries air bled from one or more aircraft engines 150 (e.g., 150a, 150b) and includes a plurality of bleed air conduits (e.g., 102a-102e), discussed in detail below. A first bleed air conduit 102a is in fluid communication with a first aircraft engine 150a for receipt of engine air bled from the first aircraft engine 150a. The first bleed air conduit 102a is in further fluid communication with an aircraft cabin 160. An output of the ACU 110 is in fluid communication with the first bleed air conduit 102a at a second bleed air junction 112b downstream of the first bleed air junction 112a.

A second bleed air conduit 102b branches from the first bleed air conduit 102a downstream of the first aircraft engine 150a at a first bleed air junction 112a. As discussed in greater detail below, the second bleed air conduit 102b is in fluid communication with an intake of the heat exchanger 106, allowing the heat exchanger to receive hot engine air in the normal and HX only operating modes of the ECS 100.

The bleed air network 102 further includes a third bleed air conduit 102c that is in fluid communication with an auxiliary power unit (APU) 152 for receipt of a flow of APU air bled from the APU 152. The third bleed air conduit 102c is branched from the second bleed air conduit 102b at a third bleed air junction 112c. A flow rate of the APU bleed air is regulated by an APU flow control shut off valve 120c. For example, the APU flow control shut off valve 120c may be a torque or electric motor type modulating valve that acts as a variable orifice to establish a normal and high flow schedule for the ECS 100. The APU flow control shut off valve 120c is normally closed (indicated as N/C in FIG. 1) so that, in the absence of power, the APU flow control shut off valve 120c is driven closed by upstream pressure.

When the APU flow control shut off valve 120c is closed, the APU air does not pass through the APU flow control shut off valve 120c and the engine air received by the heat exchanger 106 does not include the APU air. When the APU flow control shut off valve 120c is open, the APU air does pass through the APU flow control shut off valve 120c and the engine air received by the heat exchanger 106 includes the APU air.

An APU check valve 122 may be further interposed between the APU flow control shut off valve 120c and the third bleed air junction 112c. The APU check valve 122 is a one way valve that permits flow of the APU air downstream of the APU 152 and inhibits backflow of engine air upstream towards the APU 152. For example, the APU check valve 122 may be a dual flapper, spring-loaded closed valve. When the engine air pressure gets significantly higher than the APU air pressure the APU check valve closes shutting off APU air flow.

The bleed air network 102 also includes a fourth bleed air conduit 102d. The fourth bleed air conduit 102d in fluid communication with a second aircraft engine 150b for receipt of engine air bled from the second aircraft engine 150b. The fourth bleed air conduit 102d is in further fluid communication with the aircraft interior cabin and branches from the second bleed air conduit 102b at a fourth bleed air junction 112d. The third bleed air junction 112c is positioned between the first bleed air junction 112a and fourth bleed air junction 112d. As discussed in greater detail below, the output of the ACU 110 is in further fluid communication with the fourth bleed air conduit 102d at a fifth bleed air junction 112e downstream of the fourth bleed air junction 112d.

Engine air bled from the first aircraft engine 150a and the second aircraft engine 150b is regulated to selected pressure and temperature set points prior to receipt by the heat exchanger 106 (e.g., upstream of the first bleed air junction 112a and fourth bleed air junction 112d). This regulated engine air is also referred to as tempered bleed air herein. The pressure set point of the tempered engine bleed air may be regulated by respective first and second engine pressure regulating shut off valves 114a, 114b that are normally in the open position (illustrated as N/O in FIG. 1). The temperature set point of the tempered engine bleed air may be regulated by respective heat exchangers 116a, 116b. In an embodiment, the tempered bleed air received by the heat exchanger 106 from the bleed air network 102 may possess a temperature of about 475° F. and a pressure of about 31.5 psig.

A flow rate of the tempered engine bleed air received at the first and fourth bleed air junctions 112a, 112d may be regulated by a first and second engine flow control shut off valves 120a, 120b, respectively. For example, the flow control shut off valves 120a, 120b may be pneumatically controlled butterfly or poppet style pressure regulators with fixed downstream nozzles. The fixed nozzles may choke the flow of engine bleed air at one of two set points in reference to ambient pressure to establish a normal and high flow schedule for the ECS 100. The first and second engine flow control shut off valves 120a, 120b are spring loaded closed and normally open (designated as N/O in FIG. 1) and regulating to normal flow with upstream pressure in the absence of electrical power and closed with the application of electrical power. A reverse check feature on the first and second engine flow control shut off valves 120a, 120b may further keep air from backflow upstream towards the first and second engines 150a, 150b.

In flight, engine air may be supplied to the heat exchanger 106 or the ACU 110 by the first engine 150a, the second engine 150b, the APU, and combinations thereof. This flexibility is provided by use of a cross-flow shutoff valve 124 interposed between the third and fourth bleed air junctions 112c, 112d (i.e., within the second bleed air conduit 102b). The cross-flow shutoff valve 124 is a normally open shut off valve. As discussed in greater detail below, when the cross-flow shutoff valve 124 is open, engine air flows from the second engine 150b through the cross-flow shutoff valve 124. Thus, the engine air received by the heat exchanger 106 includes engine air bled from each of the first and second engines 150a, 150b. In contrast, when the cross-flow shutoff valve 124 is closed and the engine air received by the heat exchanger 106 does not include engine air bled from the second engine 150b.

For example, in certain embodiments, the when the APU flow control shut off valve 120c is open, the engine air supplied to the heat exchanger 106 comes from the source having the highest supply pressure. For example, engine air bled from the APU 152 may be at a greater pressure than that bled from either or both of the engines 150a, 150b on the ground and through about 15,000 ft. altitude in the air. This is because the pressure of engine air bled from the engines 150a, 150b is relatively constant, since it is regulated by the valves 114a, 114b, respectively. In contrast, the pressure of engine air bled from the APU 152 decreases nearly linearly with increasing aircraft altitude. Thus, in certain embodiments, engine air bled from the APU 152 will be received by the heat exchanger 106 on the ground. After takeoff, when the aircraft is at a specific altitude, the pressure of engine air bled from the APU 152 is approximately equal to engine air bled from the engines 150a, 150b and a mix of engine air bled from the APU 152 and at least one of the engines 150a, 150b is received by the heat exchanger 106. Above this specific altitude, the pressure of air bled from the engines 150a, 150b exceeds the pressure of engine air bled from the APU 152 and shuts off flow of the engine air bled from the APU 152 via the check valve 122. Thus, under this circumstance, the engine air bled from at least one of the engines 150a, 150b is received by the heat exchanger 106.

The ambient air network 104 carries a flow of ambient air and is in fluid communication with each of the heat exchanger 106 and the ACU 110. In an embodiment, the ambient air network 104 includes a first ambient air conduit 104a in fluid communication with the aircraft exterior (e.g., ambient air intake 126a) for receipt of the ambient air (i.e., ram air) and is in further fluid communication with the heat exchanger 106. The ambient air network 104 further includes a second ambient air conduit 104b that branches from the first ambient air conduit 104a at a first ambient air junction 130a and is in fluid communication with the ACU 110.

A temperature control valve (TCV) 132 is interposed between the first ambient air junction 130a and the heat exchanger 106 for controlling a flow rate of ram air received by the heat exchanger 106. For example, a temperature controller 138 is in electrical communication with the TCV 132, a temperature sensor T1 that measures the temperature of HX air output by the heat exchanger 106, and a temperature sensor T2 that measures the temperature of the aircraft cabin 160. The temperature controller 138 is operative to adjust the flow rate of the ram air based upon the temperature of the HX air output measured by sensor T1 and the mode of operation of the ECS 100. As discussed below, in the normal operating mode, the temperature controller 138 adjusts the flow rate of the ram air to maintain the HX air at a selected, constant temperature set point. In certain embodiments, this set point may be a pre-defined value set by an operator of the aircraft. In the HX only mode, the temperature controller 138 adjusts the flow rate of the ram air based upon the temperature of the aircraft cabin 160 measured by sensor T2 and a desired cabin temperature (e.g., a temperature set by an aircraft operator or crew member).

When the aircraft is operating on the ground, however, ram air is unavailable for use, since the aircraft is stationary or moving at low speed. Accordingly, the ambient air network 104 includes a third ambient air conduit 104c in fluid communication with the aircraft exterior (e.g., ambient air intake 126b) for receipt of ambient air and is in further fluid communication with the heat exchanger 106. A blower 134 is further in fluid communication with the third ambient air conduit 104c for urging ambient air through the third ambient air conduit 104c. For example, the blower 134 is an axial fan installed in a branch of the third ambient air conduit 104c off of the intake 126b and is operated when the aircraft is on the ground. The cold ambient air provided by the blower 134 does not require temperature modulation by the TCV 132 because as the maximum cooling possible from the ambient air is desired during ground operations.

When the aircraft is operating in flight, ram air is supplied to the heat exchanger 106. To prevent the ram air from flowing through the intake 126b, an ambient air check valve 136 is further interposed between the ambient air intake 126b and the heat exchanger 106 (e.g., downstream of the blower 134). For example, the ambient air check valve 136 may be a dual petal spring loaded closed valve.

The ambient air network 104 additionally includes a fourth ambient air conduit 104d that branches from the second ambient air conduit 104b at a second ambient air junction 130b. The fourth ambient air conduit 104d carries ambient air directly to the aircraft cabin 160 in the ECS off operating mode of the ECS 100, as discussed in greater detail below.

The heat exchanger 106 is a cross-flow heat exchanger with two primary paths. A first path receives a flow of hot air (e.g., the engine air) and a flow of cold air (e.g., the ambient air). The flow of hot air is controlled by the HX SOV 128. The flow of cooling air is controlled by the TCV 132 in flight. The flow of cooling air is controlled by the blower 134 on the ground. So configured, the heat exchanger 106 outputs a flow of HX air at a temperature less than that of the received engine air in response to receipt of the engine air and ambient air.

The ACU 110 is used to provide cooling air to aircraft cabin 160. The ACU 110 is in fluid communication with the output of the heat exchanger 106 and the ambient air network 104 via the second ambient air conduit 104b. The ACU 110 uses ram air for cooling during flight and exerts suction to pull adequate ambient air during ground operations. In operation, the ACU 110 outputs a flow of ACU air having a temperature less than the HX air in response to receipt of the HX air and the ambient air. The temperature of the ACU air may be regulated by an ACU controller 118 in electrical communication with a temperature sensor T6 in thermal communication with the ACU air.

To heat the aircraft cabin 160, the cold ACU air output by the ACU 110 may be mixed additional hot engine air is mixed with. As discussed above, a portion of the cold ACU air output of the ACU 110 is in fluid communication with the first bleed air conduit 102a at the second bleed air junction 112b, downstream of the first bleed air junction 112a. Another portion of the cold ACU air output by the ACU 110 is in fluid communication with the fourth bleed air conduit 102d at the fifth bleed air junction 112e, downstream of the first bleed air junction 112a. In further embodiments, the cold ACU air output by the ACU 110 may be directed to the aircraft cabin 160 without prior mixing with the hot engine air.

In one aspect, additional hot engine air is a flow of engine air carried by the first bleed air conduit 102a downstream of the first bleed air junction 112a and/or a flow of engine air carried by the fourth bleed air conduit 102d downstream of the fourth bleed air junction 112d. Temperature control valve 140a is interposed between the first and second bleed air junctions 112a, 112b for controlling the flow rate of engine air carried downstream of the first bleed air junction 112a within the first bleed air conduit 102a. Temperature control valve 140b is interposed between the fourth and fifth bleed air junctions 112d, 112e for controlling the flow rate of engine air carried downstream of the fourth bleed air junction 112d within the fourth bleed air conduit 102d.

The TCVs 140a, 140b may be torque or electric motor controlled modulating valve that modulates the amount of engine air that is mixed with the cold ACU air in the first and fourth bleed air conduits 102a, 102d, respectively. For example, a temperature controller 142a is in electrical communication with the TCV 140a, the temperature sensor T2 that measures the temperature of the aircraft cabin 160, and, optionally, a temperature sensor T3 that measures the temperature of the mixture of the hot engine air and ACU air within the first bleed air conduit 102a downstream of the second bleed air junction 112b. A temperature controller 142b is in electrical communication with the TCV 140b, a temperature sensor T4 that measures the temperature of the aircraft cabin 160, and, optionally, a temperature sensor T5 that measures the temperature of the mixture of the hot engine air and ACU air within the fourth bleed air conduit 102d downstream of the fifth bleed air junction 112e.

In the normal operating mode, the temperature controller 142a adjusts the flow rate of the engine air through the TCV 140a based upon the temperature of the aircraft cabin 160 measured by the sensor T2 and a desired temperature within the aircraft cabin 160. The temperature controller 142b adjusts the flow rate of the engine air through the TCV 140b based upon a temperature of the aircraft cabin 160 measured by sensor T4 and the desired temperature within the aircraft cabin 160. In certain embodiments, the in-cabin temperature sensors T2 and T4 may be the same. In alternative embodiments, the sensors T2 and T4, as well as the desired temperature being controlled from the sensors T2 and T4 may be different (e.g., one of the sensors may be located in a crew cabin portion of the aircraft and the other in a passenger cabin portion of the aircraft).

A plurality of cabin check valves 162a-162d are further interposed between the aircraft cabin 160 and the first and fourth bleed air conduits 102a, 102d. The cabin check valves 162a-162d are one way valves that permit flow of air into the aircraft cabin 160 and inhibits backflow upstream into the ECS 100. For example, the cabin check valves 162a-162d may be a four petal, spring-loaded closed valves installed on the pressure bulkhead of the aircraft.

In the discussion above, Normal operation of the ECS 100 has been assumed. Additional components of ECS 100 will now be discussed that allow the air flow pathways within the ECS 100 to be changed, allowing switching between the Normal mode, the HX only mode, and the ACU only mode.

In the HX only mode, the output of the heat exchanger 106 is redirected from the ACU 110 to the first bleed air conduit 102a, bypassing the ACU 110. In order to perform this redirection, the ECS 100 further includes an heat exchanger/ACU shut off valve (HX/ACU SOV) 170 to block air flow between the heat exchanger 106 and ACU 110, an ACU bypass conduit 172 to redirect the HX air flow, a backup heat exchanger shut off valve (backup HX SOV) 174 to block HX air flow through the ACU bypass conduit 172, and a backup check valve 178.

The HX/ACU SOV 170 is a normally open shut off valve positioned between the heat exchanger 106 and the ACU 110. For example, the HX/ACU SOV 170 may be a spring loaded open, pneumatically powered to close and electrically controlled gate or butterfly valve. When open, the HX/ACU SOV 170 permits receipt of the HX air output from the heat exchanger 106 by the ACU 110. When closed, the HX/ACU SOV 170 inhibits receipt of the HX air output from the heat exchanger 106 by the ACU 110.

The ACU bypass conduit 172 is in fluid communication with the output of the heat exchanger 106 and the first bleed air conduit 102a downstream of the TCV 140a. For example, in one embodiment, the ACU bypass conduit 172 may be connected to the first bleed air conduit 102a at a seventh bleed air junction 112g.

The backup HX SOV 174 is interposed between the heat exchanger 106 and the first bleed air conduit 102a. For example, the backup HX SOV 174 may be a spring loaded open, pneumatically powered to close and electrically controlled gate or butterfly valve. When open, the backup HX SOV 174 permits receipt of the HX air output from the heat exchanger 106 by the first bleed air conduit 102a via the ACU bypass conduit 172. When closed, the backup HX SOV 174 inhibits receipt of the HX air output from the heat exchanger 106 by the first bleed air conduit 102a via the ACU bypass conduit 172.

The HX/ACU check valve 176 is interposed between the heat exchanger 106 and the ACU 110, downstream of the HX/ACU SOV. For example, the HX/ACU check valve 176 is a one way valve that permits flow of the HX air downstream of the heat exchanger 106 and inhibits backflow upstream towards the heat exchanger 106. For example, the HX/ACU check valve 176 may be a dual petal, spring-loaded closed valve.

The backup check valve 178 is interposed between the heat exchanger 106 and the first bleed air conduit 102a, downstream of the HX SOV 174. For example, the backup check valve 178 is a one way valve that permits flow of the HX air downstream of the heat exchanger 106 and inhibits backflow upstream towards the heat exchanger 106.

In the ACU only mode, the engine air is received directly by the ACU 110 from the bleed air network 102, bypassing the heat exchanger 106. In order to perform this redirection, the ECS 100 further includes a heat exchanger shut off valve (HX SOV) 180 to block intake of engine air by the heat exchanger 106, an HX bypass conduit 182 to redirect the engine air flow, and an ACU shut off valve (ACU SOV) 184 to block engine air flow to the ACU 110 via the HX bypass conduit 182.

The HX SOV 180 is a normally closed shut off valve positioned between the heat exchanger 106 and the bleed air network 102 (e.g., the second bleed air conduit 102b). For example, the HX SOV 180 may be a spring loaded open, pneumatically powered to close and electrically controlled gate or butterfly valve. When open, the HX SOV 180 permits receipt of the engine air by the heat exchanger 106. When closed, the HX SOV 180 inhibits receipt of the engine air by the heat exchanger 106.

The HX bypass conduit 182 branches from the fourth bleed air conduit 102d at a sixth bleed air junction 102f, downstream of the fourth bleed air junction 112d and is in fluid communication with an intake of the ACU 110.

The ACU SOV 184 is interposed between the ACU 110 and the fourth bleed air conduit 102d. For example, the ACU SOV 184 may be a spring loaded open, pneumatically powered to close and electrically controlled gate or butterfly valve. When open, the ACU SOV 184 permits receipt of the engine air by the ACU 110 via the HX bypass conduit 182. When closed, the backup HX SOV 174 inhibits receipt of the HX air output from the heat exchanger 106 by the first bleed air conduit 102a via the ACU bypass conduit 172.

In the ECS off mode, the ECS 100 blocks flow of engine air from the heat exchanger 106, the ACU 110, and the aircraft cabin 160. Instead, ram air is directed to the cabin. In order to perform this redirection, the ECS 100 further includes an ambient air check valve 190 interposed between the second ambient air junction 130b and the aircraft cabin 160. For example, the ambient air check valve 190 is a one way valve that permits flow of ambient air downstream of ambient air intake 126a and inhibits backflow of air from the aircraft cabin 160 upstream towards the ambient air intake 126a. For example, the ambient air check valve 190 may be a dual petal, spring-loaded closed valve.

Figure 2:
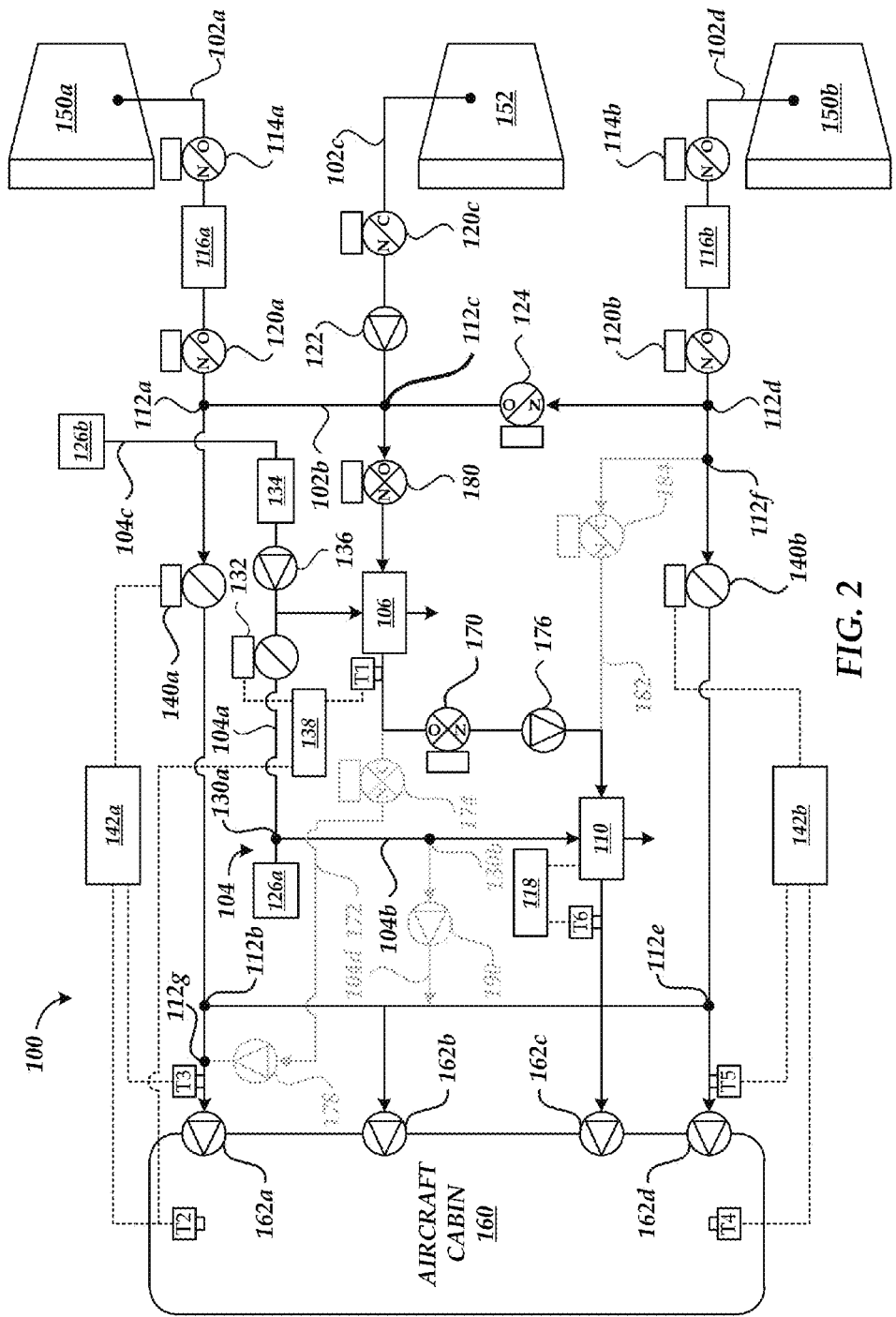
FIG. 2 is an embodiment of the ECS of FIG. 1 illustrating air flow pathways in a normal operating mode, where engine air flow is routed through a heat exchanger (HX) and an air conditioning unit (ACU) in series for cooling.

The discussion will now turn to FIG. 2, which illustrates air flow pathways within the ECS 100 when operating in the Normal mode. For ease of discussion, air flow pathways not used are illustrated in gray. In the Normal mode, the HX SOV 180 is open and the ACU SOV 184 is closed, permitting receipt of engine air only by the heat exchanger 106. Additionally, the HX/ACU SOV 170 is open and the backup HX SOV 174 is closed, permitting output of the HX air only to the ACU 110.

Engine air is bled from the first engine 150a and received by the bleed air network 102 for input to the heat exchanger 106. If an operator of the aircraft desires that engine air directed to the heat exchanger 106 is to include engine air bled from the second engine 150b, the second engine shut off valve 120b and the cross-flow shut off valve 124 are open. Otherwise, each is closed. If an operator of the aircraft desires that the engine air directed to the heat exchanger 106 is includes APU air bled from the APU 152, the APU shut off valve 120c is open. Otherwise, the APU shut off valve 120c is closed. The engine air so provided is directed through the second bleed air conduit 102b and received by the heat exchanger 106.

When the aircraft is operating in the air, ram air is available for use as the ambient air by the heat exchanger and ACU 110. The ram air flow to the heat exchanger 106 is controlled by the temperature controller 138 and the TCV 132 to modulate the ram air received by the heat exchanger 106 via the first ambient air conduit 104a. The temperature controller 138 adjusts the flow rate of the ram air based upon the temperature of the HX air output measured by sensor T1 to maintain the HX air at a selected, constant temperature set point. In certain embodiments, this set point may be a pre-defined value set by an operator of the aircraft. The ram air flow to the ACU 110 is carried by the second ambient air conduit 104b.

When the aircraft is operating on the ground, ram air is unavailable. Accordingly, the blower 134 provides the ambient air to the heat exchanger 106 via the third ambient air conduit 104c. The ACU 110 further applies mild suction to draw ambient air into the second ambient air conduit 104b for use.

The heat exchanger 106 outputs HX air in response to receipt of the engine air and ambient air. The HX air has a temperature less than that of the engine air and is further directed to the intake of the ACU 110. The ACU 110 further receives ambient air for cooling via the second ambient air conduit 104b.

Respective portions of the ACU air output by the ACU 110 are directed to the first and fourth bleed air conduits 102a, 102d for mixing with further engine air or directly to the aircraft cabin 160. The flow rate of engine air mixed with ACU air in the first bleed air conduit 102a is regulated by the TCV 140a and temperature controller 142a based upon the temperature of the aircraft cabin 160 and a desired temperature within the aircraft cabin. The flow rate of engine air mixed with ACU air in the fourth bleed air conduit 102d is regulated by the TCV 140b and temperature controller 142b based upon the temperature of the aircraft cabin 160 and a desired temperature within the aircraft cabin. The mixed air flow is subsequently vented to the aircraft cabin 160.

Figure 3:
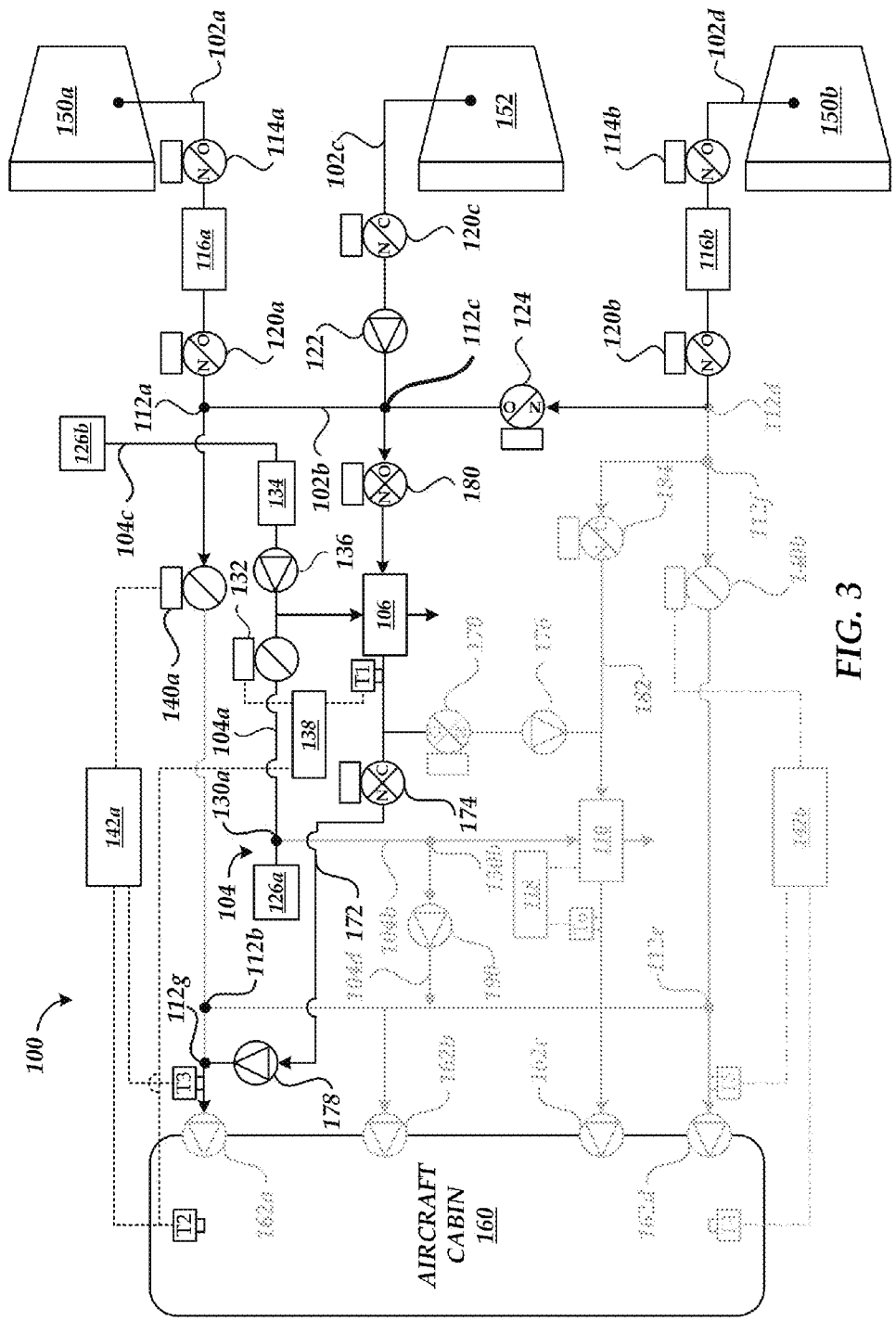
FIG. 3 is an embodiment of the ECS of FIG. 1 illustrating air flow pathways in an ACU operating mode, where the engine air flow bypasses the heat exchanger.

The discussion will now turn to FIG. 3, which illustrates air flow pathways within the ECS 100 when operating in the HX only mode. For ease of discussion, air flow pathways not used are illustrated in gray. In the HX only mode, the HX SOV 180 is open and the ACU SOV 184 is closed, permitting receipt of the engine air only by the heat exchanger 106. The backup HX SOV 174 is open and the HX/ACU SOV 170 is closed, permitting output of the HX air only via the ACU bypass conduit 172.

Engine air is bled from the first engine 150a and received by the bleed air network 102 for input to the heat exchanger 106. If an operator of the aircraft desires that engine air directed to the heat exchanger 106 is to include engine air bled from the second engine 150b, the second engine shut off valve 120b and the cross-flow shut off valve 124 are open. Otherwise, each is closed. If an operator of the aircraft desires that the engine air directed to the heat exchanger 106 is includes APU air bled from the APU 152, the APU shut off valve 120c is open. Otherwise, the APU shut off valve 120c is closed. The engine air so provided is directed through the second bleed air conduit 102b and received by the heat exchanger 106.

When the aircraft is operating in the air, ram air is available for use as the ambient air. The cooling air flow to the heat exchanger 106 is controlled by the temperature controller 138 and the TCV 132 to modulate the ram air received by the heat exchanger 106 via the first ambient air conduit 104a. The temperature controller 138 adjusts the flow rate of the ram air based upon the temperature of the aircraft cabin 160 measured by sensor T2 and a desired cabin temperature (e.g., a temperature set by an aircraft operator or crew member).

When the aircraft is operating on the ground, ram air is unavailable. Accordingly, the blower 134 provides the ambient air to the heat exchanger 106 via the third ambient air conduit 104c.

The heat exchanger 106 outputs HX air in response to receipt of the engine air and the ambient air. The HX air has a temperature less than that of the engine air and is directed to first bleed air conduit 102a. Unlike in the normal operating mode, the HX air in the HX only mode is not mixed with further engine air upon receipt within the first bleed air conduit 102a. For example, the TCV 140a may be closed in the HX only mode to inhibit flow of the engine air downstream of the TCV 140a. Instead, the HX air received in the first bleed air conduit 102a is vented directly to the aircraft cabin 160.

Figure 4:
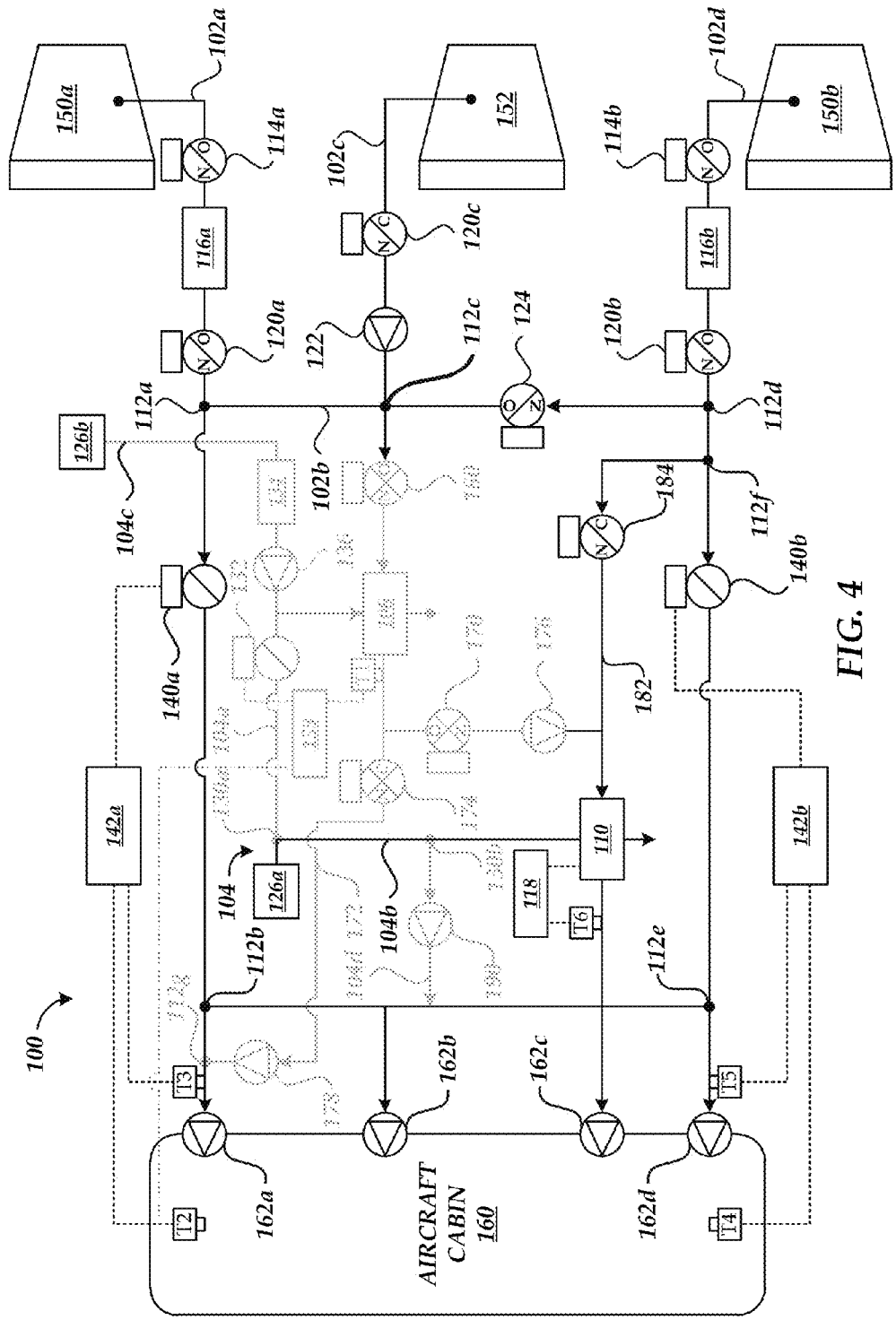
FIG. 4 is an embodiment of the ECS of FIG. 1 illustrating air flow pathways in an HX operating mode, where the engine air flow bypasses the ACU.

The discussion will now turn to FIG. 4, which illustrates air flow pathways within the ECS 100 when operating in the ACU only mode. For ease of discussion, air flow pathways not used are illustrated in gray. In the ACU only mode, the HX SOV 180 is closed and the ACU SOV 184 is open, permitting receipt of engine air only by the ACU 110. The TCV 132 is further closed and the blower is off, permitting receipt of ambient air only by the ACU 110. The backup HX SOV 174 and HX/ACU SOV 170 are also closed, inhibiting output of HX air to either the ACU 110 or the first bleed air conduit 102a via the ACU bypass conduit 172.

Engine air is bled from the first engine 150a and received by the bleed air network 102 for input to the ACU 110. If an operator of the aircraft desires that engine air directed to the ACU 110 is to include engine air bled from the second engine 150b, the second engine shut off valve 120b and the cross-flow shut off valve 124 are open. Otherwise, each is closed. If an operator of the aircraft desires that the engine air directed to the ACU 110 is includes APU air bled from the APU 152, the APU shut off valve 120c is open. Otherwise, the APU shut off valve 120c is closed. The engine air so provided is directed through the HX bypass conduit 182 and received by the ACU 110.

When the aircraft is operating in the air, ram air is available for use as the ambient air. The ram air flow to the ACU 110 is carried by the second ambient air conduit 104b. When the aircraft is operating on the ground, ram air is unavailable and the ACU 110 applies mild suction to draw ambient air into the second ambient air conduit 104b for use.

Respective portions of the ACU air output by the ACU 110 are directed to the first and fourth bleed air conduits 102a, 102d for mixing with further engine air. The flow rate of engine air mixed with ACU air in the first bleed air conduit 102a is regulated by the TCV 140a and temperature controller 142a based upon the temperature of the aircraft cabin 160 and a desired temperature within the aircraft cabin. The flow rate of engine air mixed with ACU air in the fourth bleed air conduit 102d is regulated by the TCV 140b and temperature controller 142b based upon the temperature of the aircraft cabin 160 and a desired temperature within the aircraft cabin. The mixed air flow is subsequently vented to the aircraft cabin 160.

As further illustrated in FIG. 4, a portion of the ACU air may also be vented directly to the aircraft cabin 160 (e.g., via check valves 162b, 162c).

Figure 5:
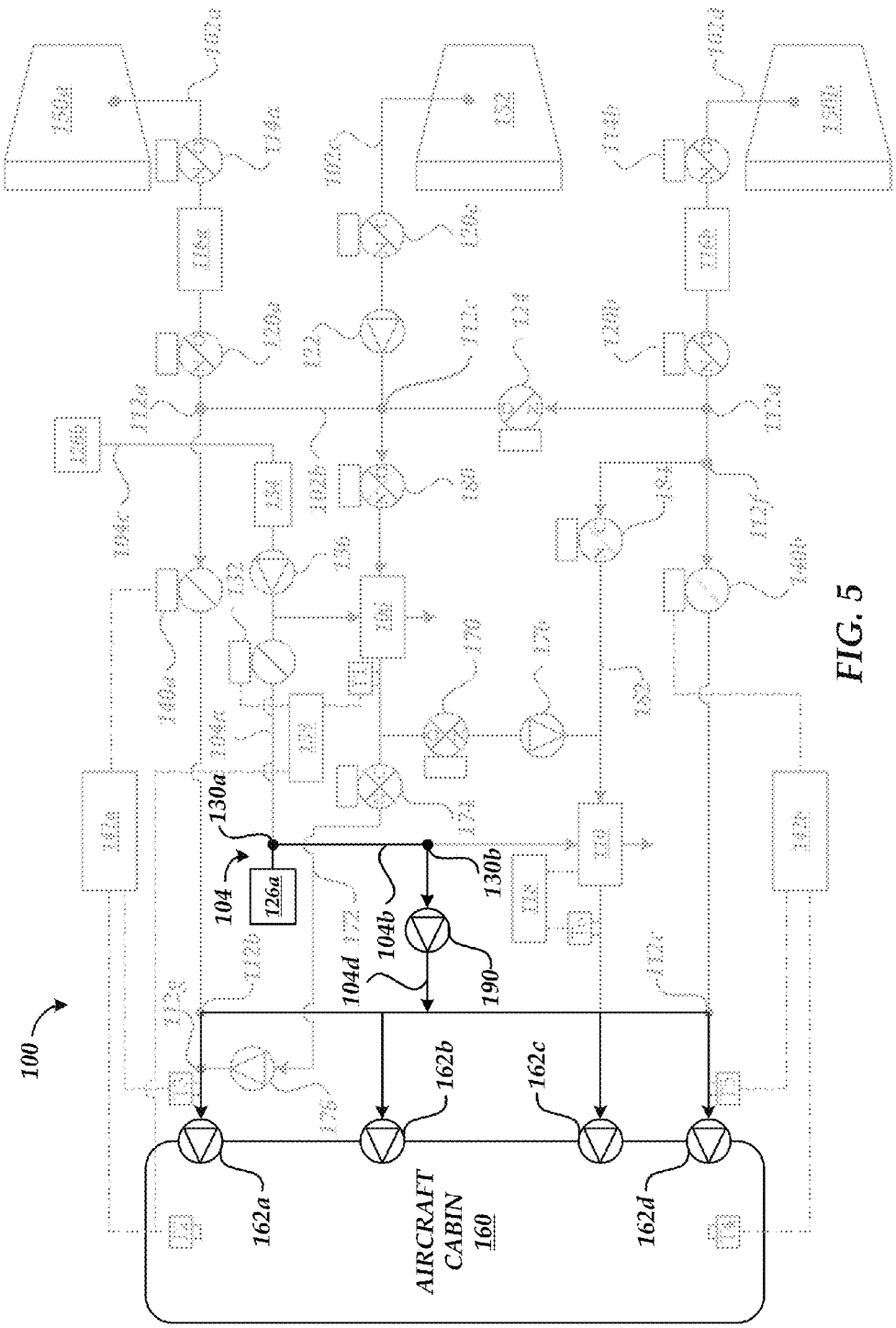
FIG. 5 is an embodiment of the ECS of FIG. 1 illustrating air flow pathways in an OFF mode, where air flow bypasses the heat exchanger and the ACU.

The discussion will now turn to FIG. 5, which illustrates air flow pathways within the ECS 100 when operating in the ECS off mode. For ease of discussion, air flow pathways not used are illustrated in gray. In the ECS off mode, and HX SOV 180 and the ACU SOV 184 are each closed, inhibiting receipt of the engine air by both the heat exchanger 106 and the ACU 110. The backup HX SOV 174 and the HX/ACU SOV 170 are further closed, permitting inhibiting output of HX air by the heat exchanger 106. Instead, only ambient air is directed to the aircraft cabin 160.

When the aircraft is operating in the air, ram air is available for use as the ambient air. The ram air flow is carried by the second and fourth ambient air conduits 104b, 104d. When the aircraft is operating on the ground, ram air is unavailable. The ram air flow is so received is directed to the aircraft cabin 160.

The terms comprise, include, and/or plural forms of each are open ended and include the listed parts and can include additional parts that are not listed. And/or is open ended and includes one or more of the listed parts and combinations of the listed parts.

One skilled in the art will realize that embodiments of the disclosure may include other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An environmental control system for aircraft, comprising:
    a bleed air network for carrying flows of air bled from a plurality of aircraft engines, comprising:
        a first bleed air conduit in fluid communication with a first aircraft engine for receipt of engine air bled from the first aircraft engine and in further fluid communication with an aircraft interior cabin;
        a second bleed air conduit branched from the first bleed air conduit at a first bleed air junction and in fluid communication with a heat exchanger;
    an ambient air network for carrying a flow of ambient air, comprising:
        a first ambient air conduit in fluid communication with an aircraft exterior for receipt of ambient air and in further fluid communication with the heat exchanger; and
        a second ambient air conduit branching from the first ambient air conduit at a first ambient air junction and in fluid communication with an air conditioning unit;
    the heat exchanger having an output in fluid communication with the air conditioning unit, wherein the heat exchanger is operative to output a flow of heat exchanger air, at a second temperature less than the first temperature, in response to receipt of the engine air and the ambient air;
    the air conditioning unit having an output in fluid communication with the first bleed air conduit at a second bleed air junction downstream of the first bleed air junction, wherein the air conditioning unit is operative to output a flow of air conditioning unit air at a third temperature, less than the second temperature, in response to receipt of the heat exchanger air and the ambient air;

a first temperature control valve interposed between the first and second bleed air junctions and operative to control a first engine air flow rate through the first bleed air conduit downstream of the second bleed air junction based upon a cabin temperature set point and a cabin temperature measured by at least one of a plurality of temperature sensors in thermal communication with the aircraft interior cabin.

2. The environmental control system of claim 1, wherein the bleed air network further comprises a third bleed air conduit in fluid communication with an auxiliary power unit for receipt of auxiliary power unit air bled from the auxiliary power unit, the third segment branching from the second bleed air conduit at a third bleed air junction.

3. The environmental control system of claim 2, further comprising an auxiliary power unit flow control shut off valve interposed between the third bleed air junction and the auxiliary power unit, wherein the engine air received by the heat exchanger does not comprise the auxiliary power unit air when the auxiliary power unit flow control shut off valve is closed and wherein the engine air received by the heat exchanger comprises the auxiliary power unit air when the auxiliary power unit flow control shut off valve is open.

4. The environmental control system of claim 2, wherein the bleed air network further comprises a fourth bleed air conduit in fluid communication with a second aircraft engine for receipt of engine air bled from the second aircraft engine and in further fluid communication with the aircraft interior cabin, wherein the fourth bleed air segment branches from the second bleed air segment at a fourth bleed air junction, wherein the third bleed air junction is positioned between the first and fourth bleed air junctions.

5. The environmental control system of claim 4, further comprising a cross-flow shut off valve interposed between the third and fourth bleed air junctions, wherein the engine air received by the heat exchanger does not comprise air bled from the second engine when the cross-flow shut off valve is closed and wherein the engine air received by the heat exchanger comprises air bled from the second engine when the cross-flow shut of valve is open.

6. The environmental control system of claim 4, wherein the output of the air conditioning unit is in further fluid communication with the fourth bleed air conduit at a fifth bleed air junction downstream of the fourth bleed air junction.

7. The environmental control system of claim 6, further comprising a second temperature control valve interposed between the fourth and fifth bleed air junctions operative to control a second engine air flow rate through the fourth segment of the bleed air network downstream of the second temperature control valve based upon the cabin temperature set point and the cabin temperature measured by at least one of the plurality of temperature sensors in thermal communication with the aircraft interior cabin.

8. The environmental control system of claim 1, wherein the ambient air received by the heat exchanger consists essentially of a ram air flow urged through the first and second ambient air conduits by motion of the aircraft.

9. The environmental control system of claim 8, further comprising a third temperature control valve interposed between the first ambient air junction and the heat exchanger, the third temperature control valve operative to control a flow rate of the ram air received by the heat exchanger based upon the second temperature and an heat exchanger (HX) temperature set point.

10. The environmental control system of claim 1, wherein the ambient air network further comprises a third conduit in fluid communication with the heat exchanger and a blower, wherein the ambient air received by the heat exchanger consists essentially of ambient air urged through the third segment by the blower.

11. The environmental control system of claim 1, further comprising:
a heat exchanger shut off valve interposed between the second bleed air conduit and the heat exchanger, wherein the heat exchanger shut off valve is operative to inhibit receipt of the engine air flow by the heat exchanger when closed and permit receipt of the engine air by the heat exchanger when open;
an heat exchanger bypass conduit branching from the fourth bleed air segment at a sixth bleed air junction downstream of the fourth bleed air junction and in fluid communication with the air conditioning unit;
an air conditioning unit shut off valve positioned between the sixth bleed air junction and the air conditioning unit, wherein the air conditioning unit shut off valve is operative to inhibit receipt of the engine bleed air by the air conditioning unit via the bleed air bypass segment when closed and permit receipt of the engine bleed air by the air conditioning unit via the bleed air bypass segment when open.

12. The environmental control system of claim 11, wherein, when the air conditioning unit shut off valve is open, the air conditioning unit outputs the air conditioning unit air at a fourth temperature, less than the first temperature, in response to receipt of the engine bleed air and the ambient air.

13. The environmental control system of claim 1, further comprising:
A heat exchanger/air conditioning unit shut off valve interposed between the heat exchanger and the air conditioning unit, wherein the heat exchanger/air conditioning unit shut off valve is operative to inhibit receipt of the heat exchanger air by the air conditioning unit when closed and permit receipt of the heat exchanger air by the air conditioning unit when open;
an air conditioning unit bypass conduit fluid communication with the heat exchanger and in further fluid communication with the first bleed air conduit downstream of the first temperature control valve;
a backup heat exchanger shut off valve interposed between the heat exchanger and the first bleed air conduit, wherein the backup heat exchanger shut off valve HX SOV is operative to inhibit receipt of the heat exchanger air by the first bleed air conduit via the air conditioning unit bypass conduit when closed and permit receipt of the heat exchanger air by the first bleed air conduit via the air conditioning unit bypass conduit when open.

14. The environmental control system of claim 13, further comprising a third temperature control valve interposed between the first ambient air junction and the heat exchanger, wherein:
the ambient air received by the heat exchanger consists essentially of a ram air flow urged through the first ambient air segment by motion of the aircraft; and
when the heat exchanger/air conditioning unit shut off valve is closed and the backup heat exchanger shut off valve is open, the third temperature control valve is operative to control a ram air flow rate received by the heat exchanger based upon the cabin temperature set point and the cabin temperature measured by at least one of the plurality of temperature sensors.

15. The environmental control system of claim 13, wherein the ambient air network further comprises a third conduit in fluid communication with the heat exchanger and a blower positioned within the third conduit, wherein the ambient air received by the heat exchanger consists essentially of ambient air urged through the third segment by the blower.

16. A method for environmental control for aircraft, comprising:
providing a bleed air network for carrying flows of air bled from a plurality of aircraft engines, comprising:
a first bleed air conduit in fluid communication with a first aircraft engine for receipt of engine air bled from the first aircraft engine and in further fluid communication with an aircraft interior cabin;
a second bleed air conduit branched from the first bleed air conduit at a first bleed air junction and in fluid communication with a heat exchanger; providing an ambient air network for carrying a flow of ambient air, comprising:
a first ambient air conduit in fluid communication with an aircraft exterior for receipt of ambient air and in further fluid communication with the heat exchanger; and
a second ambient air conduit branching from the first ambient air conduit at a first ambient air junction and in fluid communication with an air conditioning unit;
outputting, by the heat exchanger, a flow of heat exchanger air, at a second temperature less than the first temperature, in response to receipt of the engine air and the ambient air;
outputting, by the air conditioning unit, a flow of air conditioning unit air at a third temperature, less than the second temperature, in response to receipt of the heat exchanger air and the ambient air;
routing a portion of the air conditioning unit air flow into fluid communication with the first bleed air conduit at a second bleed air junction downstream of the first bleed air junction; and
regulating an engine air flow rate through the first bleed air conduit downstream of the second bleed air junction based upon a cabin temperature set point and a cabin temperature within the aircraft interior cabin.

17. The method of claim 16, wherein the bleed air network further comprises a third bleed air conduit in fluid communication with an auxiliary power unit for receipt of auxiliary power unit air bled from the auxiliary power unit, the third segment branching from the second bleed air conduit at a third bleed air junction.

18. The method of claim 17, further comprising:
regulating, by an auxiliary power unit flow control shut off valve, the flow of auxiliary power unit air to the second bleed air conduit;
wherein the engine air received by the heat exchanger does not comprise the auxiliary power unit air when the auxiliary power unit flow control shut off valve is closed; and
wherein the engine air received by the heat exchanger comprises the auxiliary power unit air when the auxiliary power unit flow control shut off valve is open.

19. The method of claim 17, wherein the bleed air network further comprises a fourth bleed air conduit in fluid communication with a second aircraft engine for receipt of engine air bled from the second aircraft engine and in further fluid communication with the aircraft interior cabin, wherein the fourth bleed air segment branches from the second bleed air segment at a fourth bleed air junction, wherein the third bleed air junction is positioned between the first and fourth bleed air junctions.

20. The method of claim 19, further comprising:
regulating, by a cross-flow shut off valve interposed between the third and fourth bleed air junctions, the flow of second engine air bled from the second engine that is received by the heat exchanger;
wherein the engine air received by the heat exchanger does not comprise air bled from the second engine when the cross-flow shut off valve is closed; and
wherein the engine air received by the heat exchanger comprises air bled from the second engine when the cross-flow shut off valve is open.

21. The method of claim 19, further comprising routing a portion of the air conditioning unit air flow into fluid communication with the fourth bleed air conduit at a fifth bleed air junction downstream of the fourth bleed air junction.

22. The method of claim 21, further comprising regulating an engine air flow rate through the fourth bleed air conduit downstream of the fifth bleed air junction based upon the cabin temperature set point and the cabin temperature within the aircraft interior cabin.

23. The method of claim 16, wherein the ambient air received by the heat exchanger consists essentially of a ram air flow urged through the first and second ambient air conduits by motion of the aircraft.

24. The method of claim 23, further comprising regulating a flow rate of the ram air received by the heat exchanger based upon the second temperature and a heat exchanger temperature set point.

25. The method of claim 23, further comprising:
inhibiting the flow of heat exchanger air from the heat exchanger to the air conditioning unit;
routing the heat exchanger air from the heat exchanger to the first bleed air conduit downstream of the first bleed air junction; and
regulating a flow rate of the ram air received by the heat exchanger based upon the cabin temperature set point and the cabin temperature.

26. The method of claim 16, wherein the ambient air network further comprises a third segment in fluid communication with the heat exchanger and a blower positioned within the third segment, wherein the ambient air flow received by the heat exchanger consists essentially of ambient air urged through the third segment by the blower.

27. The method of claim 26, further comprising:
inhibiting the flow of heat exchanger air from the heat exchanger to the air conditioning unit; and
routing the heat exchanger air from the heat exchanger to the first bleed air conduit downstream of the first bleed air junction.

28. The method of claim 16, further comprising:
inhibiting the flow of engine air to the heat exchanger from the engine bleed air network;
routing engine air from the engine bleed air network to the air conditioning unit; and
outputting, in response to receipt of the engine air and the ambient air, the air conditioning unit air flow at a fourth temperature, less than the first temperature.

* * * * *